3,798,185
GAS PERMEABLE MEMBRANES AND PROCESS
FOR MAKING SAME
William E. Skiens, Walnut Creek, Ben J. Lipps, Concord,
Earl A. McLain, Walnut Creek, and Donald E. Dubocq,
Concord, Calif., assignors to The Dow Chemical Company, Midland, Mich.
No Drawing. Filed Dec. 4, 1969, Ser. No. 882,289
Int. Cl. C08j 1/14
U.S. Cl. 260—2.5 M
23 Claims

ABSTRACT OF THE DISCLOSURE

The incorporation of polyorganosiloxanes and/or hydrocarbon extender oils in certain thermoplastics which are compatible with the siloxane and/or hydrocarbon oil at elevated melt temperatures and which have on oxygen permeability constant of at least about $0.5 \times 10^{-10}$ cc. cm./(cm.$^2$ sec. cm. Hg) greatly improves the permeability of membranes prepared from same to gases such as oxygen and carbon dioxide. Novel processes for making the membranes are disclosed.

REFERENCES

The invention described herein was made in the course of, or under, a contract with the Department of Health, Education, and Welfare.

BACKGROUND OF THE INVENTION

This invention relates to gas permeable membranes, suitable for use in devices such as heart-lung machines, and processes for making same.

Most synthetic polymeric materials in the form of films are permeable to gases of various kinds to some degree, however many of these materials cannot be readily fabricated into permeable membranes which have sufficient gas permeability rates and physical strengths to be useful as semipermeable barriers for efficient gas exchange between two phases or selective gas transfer between like phases. The fabrication problem is especially acute when it is desired to fabricate membranes into hollow fine fibers, since it is essential to provide uniform, continuous fibers without pin-holes, etc. in the fiber wall.

Permeable hollow fine fibers are preferred over the flat membranes because hollow fiber membranes offer the possibility of improving the gas transfer rate, reducing costs, reducing the blood priming volume in proportion to the exchange surface in artificial long-type devices and providing much larger exchange surfaces per unit of volume. These advantages have not been realized in capillary blood oxygenators because the presently available capillaries have a low percent open cross-sectional area, a large internal diameter and a prohibitive cost.

It would be desirable to use silicone rubbers due to their high gas permeability, but silicone rubbers are thermoset polymers which do not lend themselves to the preparation of hollow fine fibers and can only be fabricated into membranes at high cost.

SUMMARY OF THE INVENTION

This invention relates to membranes which may be readily fabricated into various shapes and particularly into hollow fine fibers by melt extrusion and which have improved permeability to gases such as oxygen and carbon dioxide.

More specifically the invention is directed to membranes of certain thermoplastics having incorporated therein from about 10 to 75 weight percent of membrane modifier which may be a polyorganosiloxane, a hydrocarbon extender oil or mixtures thereof wherein said thermoplastic is compatible with the siloxane and/or hydrocarbon oil at elevated melt temperatures and has an oxygen permeability constant of at least about $0.5 \times 10^{-10}$ cc. cm./(cm.$^2$ sec. cm. Hg) at 37° C. The molten mixture may be readily extruded and cooled to form the membrane.

Alternately it has been found possible to replace the hydrocarbon extender oil in the membrane with the siloxane by a post-fabrication exchange treatment.

DETAILED DESCRIPTION OF THE INVENTION

Hollow fine fibers offer a number of advantages in the treatment of solutions by reverse osmosis, ultra-filtration and other like dialytic processes for desalination of water, blood dialysis, etc. However, membranes suitable for solution processes are not necessarily effective as gas permeable membranes.

Consequently much research effort has been expended in devising new methods of fabrication and new membrane materials which may be economically formed into gas permeable membranes, and especially into hollow fine fibers which offer the advantages of large surface area per unit of volume. This research has been further stimulated by a need for biomedical devices such as blood oxygenators useful as artificial lungs or in organ perfusion, storage and transportation or devices for underwater breathing and the like.

A particular advantage of this invention is that a variety of thermoplastics which were previously unacceptable may now be used to fabricate gas permeable membranes. However, in order to effect any practical improvement in gas permeability the thermoplastic itself must have an oxygen permeability constant of at least about $0.5 \times 10^{-10}$ cc. cm./(cm.$^2$ sec. cm. Hg) and the thermoplastic must be compatible with the polyorganosiloxane and/or hydrocarbon extender oil at elevated melt temperatures.

One class of thermoplastics especially useful in this invention is the poly $\alpha$-olefins. A variety of such thermoplastics are known and are either available commercially or may be readily prepared by known polymerization techniques. Preferred poly $\alpha$-olefins are prepared from $\alpha$-olefins having from about 2 to 10 carbons and mixtures of same. The more preferred poly $\alpha$-olefins include these which have alkyl side chains such as poly-4-methyl-pentene-1. Other poly $\alpha$-olefins include polyethylene, polyisobutylene, polycisisoprene, copolymers of ethylene and propylene and like polymers.

Other useful thermoplastic materials include such polymers as polybutadiene, ethylene-vinyl acetate copolymers, butadiene-acrylonitrile copolymers, styrene-butadiene copolymers, polycarbonates, polyphenylene oxides, and the like. While many different thermoplastics are useful, those which are useful may be distinguished from those which are not on the basis of their permeability constant to oxygen, determined as hereinafter described, and of their compatibilty at elevated temperatures and incompatibilty at ambient temperatures with a polyorganosiloxane and/or a hydrocarbon oil extender.

Compatibility is essential at elevated melt temperatures so that the thermoplastic and the polyorganosiloxane and/or hydrocarbon oil extender may be melt extruded as a uniform blend to produce the membrane. Since the siloxane and the extender oil are not compatabile at ambient temperatures with the thermoplastic they are not plasticizers within the accepted sense of the term even though some reduction in the melt temperature of the blend compared to the melt temperature of the thermoplastic may be found. Usually it is necessary to exceed the melt temperature of the thermoplastic to obtain a compatible mixture. Only those thermoplastics which meet the compatibility criteria and have an oxygen permeability constant, P, of at least about $0.5 \times 10^{-10}$ are useful herein. The permeability of the membrane may be measured using the conventional "Dow Cell" technique as described in ASTM Test Method D 1434. The gas transmission rates herein were determined from measurements of pressure change and subsequent calculation of the volume of the gas transmitted through the membrane from a chamber of gas at a specified temperature and essentially constant pressure (driving force). For hollow fibers, a loop cell replaced the flat membrane cell wherein the free ends of a loop of hollow fiber were potted in an epoxy resin and the cured resin was then cut to provide a tube sheet having open fiber ends therein. The tube sheet with the fiber loop was then inserted and sealed in a copper tube to provide a test cell. All permeability measurements reported herein were obtained at 37° C.

The polyorganosiloxanes useful in this invention have an average unit formula of

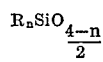

where $n$ ranges from 0.9 to 3.0 and R is a monovalent hydrocarbon radical or a monovalent halogenated hydrocarbon radical. Preferably the siloxane is a liquid at room temperature. Generally any siloxane having 2 to 3 organic radicals per silicon atom can be characterized as a liquid even though some may be quite viscous. Siloxanes having a low viscosity at ambient temperature are preferred. A particularly preferred siloxane is polydimethylsiloxane.

In the above formula R may be an alkyl radical such as methyl, ethyl, butyl, octadecyl; alkenyl radicals such as vinyl or allyl; aryl radicals such as phenyl; alicyclic radicals such as cyclohexenyl, cyclopentyl; alkaryl radicals such as tolyl; and aralkyl radicals such as benzyl. Halogenated radicals include tetrafluoroethyl, perfluorovinyl, dichlorophenyl and the like.

The direct extrusion process comprises the steps of heating the polyorganosiloxane and the thermoplastic together in the relative proportions of about 1/9 to 3/1 by weight until a uniform melt is obtained, extruding the melt and cooling the extrudate. With this process flat membranes as well as hollow fine fibers may be readily extruded. Hollow fine fibers with dimensions of from about 30 to 300$\mu$ inside diameter (I.D.) and about 45 to 400$\mu$ outside diameter (O.D.) may be fabricated. Of course, larger bore fibers may also be fabricated. A more preferred range of siloxane to thermoplastic ranges from about 1/1 to 1.5/1.

In the process of spinning hollow fine fibers from the various compositions disclosed, the polymer compositions are prepared as a slurry at room temperature in an electrically heated aluminum kettle. The kettle is brought up to spin temperature (250–260° C.) while the slurry is agitated in an $N_2$ atmosphere until the polymer melts ($\simeq$ 1 hr.) and a viscous solution is formed. The agitation is then stopped and the $N_2$ bubbles removed from the melt solution by letting it stand to de-gas ($\simeq$ ½ hr.).

The melt is then pumped from the bottom of the kettle with a metering pump, through a heated spinnerette, and the hollow fiber is formed. The fiber is drawn down to desired size by Godet rolls located approximately two feet below the spinnerette face. $N_2$ gas is pumped in the center of the fiber to keep it from collapsing during cooling. After the drawing step, the fiber is wound on packages on a standard commercial winder.

Optionally the process may include the additional step of at least partially crosslinking the polyorganosiloxane component of the membrane by exposing the membrane to ionizing radiation such as that obtainable with a Van de Graaff generator, X-rays or like radiation sources.

In place of the polyorganosiloxane or in admixture therewith there may also be used hydrocarbon extender oils which include both synthetic and naturally derived oils. To be useful it is apparent to those skilled in the art that the hydrocarbon oil must be essentially non-volatile at the elevated melt temperatures. A preferred weight ratio of hydrocarbon oil to thermoplastic ranges from about 0.8/1 to 1.5/1.

Naturally derived hydrocarbon oils particularly useful with this invention include petroleum oils marketed commercially for use in rubber compounding or the extension of synthetic rubber. Said oils may vary greatly in their composition with respect to the proportions of aromatic, naphthenic and paraffinic carbon atoms but all are high boiling oils which upon distillation have an initial boiling point of at least 500° F. and generally higher. Because these oils may vary greatly in their physical properties it is most convenient to designate those oils which are useful herein as ASTM Rubber Extending Oil Types 1, 2, 3 or 4. Said extender oils are obtained by refining crude petroleum oils.

Synthetic hydrocarbon oils include low molecular weight $\alpha$-olefin polymers and copolymers such as are obtained by polymerizing ethylene, propylene, butylene and like monomers. Polybutene oils are particularly useful because they are generally non-toxic, non-irritating and have found many uses involving contact with food. Polybutene oils with a molecular weight above about 2300 do not appear to be compatible with poly-4-methylpentene-1.

The elevated temperatures at which the melt is prepared will vary depending on the thermoplastic. Generally, a compatible melt of the thermoplastic with said siloxane or hydrocarbon oil is obtained in a temperature range of about 5° C. to 100° C. above the crystalline melting point of the thermoplastic. A range of 20–50° C. is more preferred to avoid thermal degradation of the thermoplastic. The melt temperature may also be lowered, if it is too close to the decomposition temperature, by the addition of plasticizers to the melt. Such plasticizers are well known to the art and need not be detailed herein.

A preferred embodiment of this invention is the preparation of hollow fine fibers for use in bio-medical devices such as a blood oxygenator wherein the blood is cleansed of carbon dioxide and replaced with oxygen in the same manner as the lung. Accordingly materials which are compatible with blood and are non-toxic, etc. are greatly preferred. For this reason poly-4-methylpentene-1 which has received FDA approval for use in contact with food and is being used to fabricate medical syringes, etc. is highly preferred. Similarly, polyorganosiloxanes and polybutene oils are highly preferred materials.

Another method for preparing the membranes of this invention comprises the steps of heating the thermoplastic with a hydrocarbon extender oil in place of the siloxane in the same relative proportions as in the previous process until a uniform melt is obtained, extruding the melt, cooling to form the membrane and replacing said oil by post-fabrication exchange with a polyorganosiloxane.

The post-fabrication exchange step may be accomplished by first leaching the hydrocarbon oil from the membrane with a suitable solvent which is not a solvent for that thermoplastic followed by immersion of the membrane into the polyorganosiloxane or a solution thereof. Since it is difficult to extract all the hydrocarbon oil the final membrane will usually contain some residual oil. The post-fabrication exchange treatment may also be accomplished by simultaneous extraction of the oil and replacement of same with a polyorganosiloxane by more prolonged, direct immersion of the membrane in the siloxane or solution thereof.

A combination of the two processes may also be used in that the melt may be initially prepared to contain both a polyorganosiloxane and an extender oil along with the thermoplastic. The step of at least partially cross-linking the siloxane containing membrane may be optionally practiced with any of the methods described herein.

The following non-limiting examples will further illustrate the invention.

EXAMPLE 1

A slurry of 2000 gms. of 10-centistoke viscosity polydimethylsiloxane oil (Dow Corning 200 Fluid) with 2000 gms. of a commercially available polymer of 4-methylpentene-1 (TPX-R10) having an oxygen permeability constant of about $3.6 \times 10^{-9}$ was prepared and heated to 260–270° C. with vigorous agitation for one hour. A clear, viscous solution (melt) was obtained and after allowing the air bubbles to rise and collapse the melt was extruded through a spinneret to form a hollow fiber upon cooling having an I.D. of 215μ and an O.D. of 280μ.

A loop cell was prepared, as previously described, and the permeability of the hollow fiber membrane to oxygen and carbon dioxide was measured by the "Dow Cell" test and found to be about 13.3 times higher than the permeability of the TPX polymer itself.

EXAMPLE 2

A blend of 1000 gms. of 5 centistoke polydimethylsiloxane oil (Dow Corning 200 Fluid), 1000 gms. of a commercially available polybutene oil (Indopol L-10, M.W. 320) and 2000 gms. of said poly-4-methylpentene-1 was prepared and heated to 260–270° C. with vigorous agitation for one hour. After clearing the melt of air bubbles, it was extruded as before into a hollow fiber and the permeability tested as in Example 1. The permeability was improved seven fold.

EXAMPLE 3

In the manner of the previous examples 75 gms. of polybutene oil were hot melt blended at 175° C. to 200° C. with 25 gms. of polyethylene powder (about 200,000 M.W.) having an oxygen permeability constant of about $4 \times 10^{-10}$ and pressed into membranes of from 1 to 5 mils in thickness at 175° C. with 1000 p.s.i. platen pressure.

After cooling the membranes were leached with xylene to remove the polybutene oil and were then soaked in a 10-centistoke polydimethylsiloxane oil. The resulting membranes were found to have a seven-fold improvement in permeability over the unmodified polyethylene.

EXAMPLE 4

A series of tests were made with the poly-4-methylpentene-1 polymer with varying proportions of polydimethylsiloxane or mixtures of same with polybutene oil. Membranes were prepared as before and gas permeabilities (P) for oxygen and carbon dioxide were measured with the "Dow Cell."

TPX—Siloxane Oil Blends

| Wt. ratio TPX/siloxane [1] | Siloxane visc., centistokes | Melt press temp., ° C. | $P \times 10^9$ | |
|---|---|---|---|---|
| | | | $O_2$ | $CO_2$ |
| 1/0 | | 260 | 3.6 | 9.4 |
| 1/1 | 2 | 190 | 19.5 | 39.5 |
| 1/4 | 2 | 180 | 20.5 | 55.3 |
| 1/1 | 10 | 230 | 15.4 | 36.0 |

TPX—Siloxane-Polybutene Blends

| Wt. ratio TPX/siloxane/butene | Siloxane visc., centistokes | Melt press temp., ° C. | $P \times 10^9$ | |
|---|---|---|---|---|
| | | | $O_2$ | $CO_2$ |
| 1/0.75/0.25 | [2] 20 | 210 | 12.1 | 37.6 |
| 1/0.5/0.5 | [2] 20 | 190 | 15.6 | 47.6 |
| 1/1.5/0.5 | [1] 5 | 190 | 15.4 | 37.2 |
| 1/1/1 | [1] 5 | 180 | 16.3 | 45.4 |
| 1/0.5/1.5 | [1] 5 | 210 | 17.9 | 49.0 |

[1] Polydimethylsiloxane (200 Fluid).
[2] Polydimethylsiloxane (Dow Corning 360 Medical Fluid).

EXAMPLE 5

A series of membranes were prepared from poly-4-methylpentene-1 and (TPX) and the polybutene oil (L-10) in varying proportions and gas permeabilities measured as before. Some of the membranes were then post-fabrication exchanged by first leaching the membrane with xylene and then immersing the membrane in either the polydimethylsiloxane 200 Fluid or the 360 Medical Grade Fluid (20-centistoke).

TPX—Polybutene Oil Membranes

| Membrane | Wt. ratio TPX/L-10 | Melt press temp., ° C. | $P \times 10^9$ | |
|---|---|---|---|---|
| | | | $O_2$ | $CO$ |
| 5(a) | 1/0 | 260 | 3.6 | 9.4 |
| 5(b) | 1/0.5 | 230 | 7.8 | 22.2 |
| 5(c) | 1/1 | 200 | 9.6 | 26.8 |
| 5(d) | 1/2 | 190 | 11.0 | 33.0 |
| 5(e) | 1/3 | 180 | 12.5 | 39.2 |

Post-Fabrication Exchanged Membranes

| Membrane | Post exchange treatment Siloxane | Melt press temp., ° C. | $P \times 10^9$ | |
|---|---|---|---|---|
| | | | $O_2$ | $CO_2$ |
| 5(c) | 360 fluid | 190–200 | 14.6 | 43.5 |
| 5(d) | do | 180 | 22.3 | 66.3 |
| 5(e) | do | 170–180 | 23.6 | 65.0 |
| 5(c) | 200 fluid, 10 centistoke. | 190–200 | 13.0 | 29.4 |
| 5(c) | 200 fluid, 5 centistoke. | 190–200 | 16.2 | 40.3 |

The improvement in permeability as compared to the TPX polymer itself is evident from the above results.

The usefulness of the gas permeable hollow fibers prepared by this invention in biomedical devices is further shown by the fact that extraction studies with saline solutions and human blood revealed no detectable leaching of silicone oil from a membrane similar to that prepared in Example 1. Blood compatibility studies with a similar hollow fiber showed it to be more compatible than the separate components.

It will be understood that the present invention is not limited to the specific details described above but may embody various modifications insofar as they are defined in the following claims.

What is claimed is:

1. A process for preparing membranes having improved permeability to gases which comprises preparing a molten blend of about 10 to 75 parts of a membrane modifier wherein said modifier is a polyorganosiloxane, a synthetic polymeric α-olefin hydrocarbon oil or mixtures of same with about 90 to 25 parts of a thermoplastic polymer, forming said melt into a membrane and cooling; wherein said modifier is compatible with said thermoplastic at the temperature of the melt but incompatible at ambient temperature and wherein said thermoplastic has an oxygen permeability constant of at least about $0.5 \times 10^{-10}$ cc. cm./(cm.$^2$ sec. cm. Hg) at 37° C.

2. The process of claim 1 wherein said modifier is a polyorganosiloxane having an average unit formula of

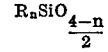

$$R_n SiO_{\frac{4-n}{2}}$$

where $n$ has an average value of 0.9 to 3 and R may be a monovalent hydrocarbon radical or a halogenated monovalent hydrocarbon radical.

3. The process of claim 2 wherein the average value of $n$ is 2 to 3.

4. The process of claim 2 wherein said siloxane is polydimethylsiloxane.

5. The process of claim 2 further comprising the step of exposing said membrane to ionizing radiation for a time sufficient to at least partially crosslink said siloxane.

6. The process of claim 1 wherein said melt is extruded as a hollow fiber.

7. The process of claim 1 wherein said modifier is a polybutene oil.

8. The process of claim 1 further comprising the step of at least partially replacing said hydrocarbon oil in the membrane with a polyorganosiloxane by a post-fabrication exchange treatment.

9. The process of claim 1 wherein said thermoplastic is a poly-α-olefin.

10. The process of claim 9 wherein said poly-α-olefin is poly-4-methylpentene-1.

11. The process of claim 9 wherein said thermoplastic is the polymerization product of an α-olefin having from 2 to about 8 carbon atoms or mixtures thereof.

12. An improved gas permeable membrane which comprises an intimate admixture of about 10 to 75 parts of a membrane modifier wherein said modifier is a polyorganosiloxane, a synthetic polymeric α-olefin hydrocarbon oil or mixtures thereof and about 90 to 25 parts of a thermoplastic polymer wherein said thermoplastic has an oxygen permeability constant of at least about $0.5 \times 10^{-10}$ cc. cm./(cm.² sec. cm. Hg) at 37° C. and is compatible with said siloxane, hydrocarbon oil or mixture thereof at elevated melt temperatures but incompatible at ambient temperatures.

13. The membrane of claim 12 wherein said modifier is a polyorganosiloxane having an average unit formula of $$R_n SiO_{\frac{4-n}{2}}$$

where $n$ has an average value of 0.9 to 3 and R may be a monovalent hydrocarbon radical or a halogenated monovalent hydrocarbon radical.

14. The membrane of claim 13 wherein the average value of $n$ is 2 to 3.

15. The membrane of claim 12 wherein said siloxane is polydimethylsiloxane.

16. The membrane of claim 13 wherein said polyorganosiloxane is at least partially crosslinked.

17. The membrane of claim 12 wherein said modifier is a polybutene oil.

18. The membrane of claim 12 wherein said thermoplastic is a poly-α-olefin.

19. The membrane of claim 18 wherein said poly-α-olefin is poly-4-methylpentene-1.

20. The membrane of claim 18 wherein said thermoplastic is the polymerization product of an α-olefin having from 2 to about 8 carbon atoms or mixtures thereof.

21. The membrane of claim 12 wherein said membrane is a hollow fiber.

22. The process of claim 2 wherein the weight proportions of siloxane to thermoplastic range from about 1/1 to 1.5/1, respectively.

23. The process of claim 1 wherein said modifier is a polymeric α-olefin hydrocarbon oil and wherein the weight proportions of said oil to thermoplastic range from about 0.8/1 to 1.5/1, respectively.

References Cited
UNITED STATES PATENTS

| | | | |
|---|---|---|---|
| 3,308,073 | 3/1967 | Kepple | 260—2.5 M |
| 3,536,796 | 10/1970 | Rock | 260—2.5 M |
| 3,228,896 | 1/1966 | Canterino et al. | 260—2.5 M |
| 3,524,753 | 8/1970 | Sharp | 260—2.5 M |
| 3,098,831 | 7/1963 | Carr | 260—2.5 E |
| 3,488,304 | 1/1970 | Baugh | 260—33.6 Si |
| 3,511,788 | 5/1970 | Keil | 260—33.6 Si |

MURRAY TILLMAN, Primary Examiner

M. FOELAK, Assistant Examiner

U.S. Cl. X.R.

128—1; 260—2.5 R, 2.5 S, 33.6 PQ, 33.6 SB, 33.6 AQ, 33.6 UA, 824, 827